(12) United States Patent
Beadie et al.

(10) Patent No.: US 10,443,494 B2
(45) Date of Patent: Oct. 15, 2019

(54) SYSTEM AND METHOD FOR PROVIDING HIGHLY REACTIVE FUELS TO A COMBUSTOR

(71) Applicant: General Electric Company, Schenectady, NY (US)

(72) Inventors: Douglas Frank Beadie, Greer, SC (US); Ilya Alexandrovich Slobodyanskiy, Simpsonville, SC (US); Jeffrey Scott Goldmeer, Latham, NY (US)

(73) Assignee: General Electric Company, Schenectady, NY (US)

( * ) Notice: Subject to any disclaimer, the term of this patent is extended or adjusted under 35 U.S.C. 154(b) by 491 days.

(21) Appl. No.: 15/213,958

(22) Filed: Jul. 19, 2016

(65) Prior Publication Data

US 2017/0022898 A1 Jan. 26, 2017

Related U.S. Application Data

(60) Provisional application No. 62/195,918, filed on Jul. 23, 2015.

(51) Int. Cl.
*F02C 3/26* (2006.01)
*F02C 7/22* (2006.01)
(Continued)

(52) U.S. Cl.
CPC ............... *F02C 3/26* (2013.01); *F02C 3/20* (2013.01); *F02C 3/30* (2013.01); *F02C 6/18* (2013.01);
(Continued)

(58) Field of Classification Search
CPC ...... F02C 3/26; F02C 3/20; F02C 3/30; F02C 3/34; F02C 6/18; F02C 7/224; F02C 9/26; F02C 9/40; F05D 2270/082; Y02E 20/16
(Continued)

(56) References Cited

U.S. PATENT DOCUMENTS

2009/0071118 A1* 3/2009 Ma .......................... F02C 9/40
60/39.26
2012/0167547 A1* 7/2012 Zhang ................... F01D 25/002
60/39.183
(Continued)

FOREIGN PATENT DOCUMENTS

EP 1953352 A2 8/2008
EP 2573359 A2 3/2013

OTHER PUBLICATIONS

International Search Report and Written Opinion issued in connection with corresponding PCT Application No. PCT/US2016/043097 dated Oct. 26, 2016.

*Primary Examiner* — Phutthiwat Wongwian
*Assistant Examiner* — Loren C Edwards
(74) *Attorney, Agent, or Firm* — Dority & Manning, P.A.

(57) ABSTRACT

A system and related method for providing a highly reactive fuel to a combustor of a gas turbine are disclosed herein. The system includes a fuel supply system that is in fluid communication with a fuel supply. The fuel supply system includes multiple fuel circuits. Each fuel circuit individually feeds fuel to a corresponding fuel distribution manifold. The system further includes a steam injection system. The steam injection system includes at least one flow control valve that is in fluid communication with at least one of the fuel circuits. The flow control valve provides for fluid communication between a superheated steam source and the fuel
(Continued)

circuit during both fueled operation and during non-fueled operation of the corresponding fuel circuit.

9 Claims, 4 Drawing Sheets

(51) Int. Cl.
*F02C 7/224* (2006.01)
*F02C 9/40* (2006.01)
*F02C 3/20* (2006.01)
*F02C 3/30* (2006.01)
*F02C 6/18* (2006.01)
*F02C 9/26* (2006.01)

(52) U.S. Cl.
CPC .............. *F02C 7/222* (2013.01); *F02C 7/224* (2013.01); *F02C 9/26* (2013.01); *F02C 9/40* (2013.01); *F05D 2270/082* (2013.01); *Y02E 20/16* (2013.01)

(58) Field of Classification Search
USPC .......................................................... 60/783
See application file for complete search history.

(56) References Cited

U.S. PATENT DOCUMENTS

2013/0074515 A1* 3/2013 Widener .................. F02C 3/30
60/780
2014/0238032 A1 8/2014 Fitzgerald et al.

* cited by examiner

SYSTEM AND METHOD FOR PROVIDING HIGHLY REACTIVE FUELS TO A COMBUSTOR

CROSS REFERENCE TO RELATED APPLICATIONS

The present application claims filing benefit of U.S. Provisional Patent Application Ser. No. 62/195,918 having a filing date of Jul. 23, 2015, which is incorporated by reference herein in its entirety.

FIELD OF THE INVENTION

The present invention relates to the gas fuel supplied to a gas turbine, and more particularly to a system and method that utilizes a steam injection system to modulate the properties of the gas fuel and/or to purge a fuel distribution manifold.

BACKGROUND OF THE INVENTION

A gas turbine generally includes an inlet section, a compressor section, a combustion section, a turbine section and an exhaust section. The inlet section cleans and conditions a working fluid (e.g., air) and supplies the working fluid to the compressor section. The compressor section progressively increases the pressure of the working fluid and supplies a compressed working fluid to the combustion section. The compressed working fluid and a fuel such as natural gas is mixed within the combustion section and burned in a combustion chamber to generate combustion gases having a high temperature and pressure. The combustion gases are routed from the combustion section into the turbine section where they expand to produce work. For example, expansion of the combustion gases in the turbine section may cause a shaft to rotate. The shaft may be connected to a generator to produce electricity.

Due to the continuous surge in natural gas demand, the supply of pipeline natural gas may, on occasion, become unable to satisfy the demand for natural gas fuel. As a result, gas turbine operators are constantly looking for suitable alternate fuels to burn within their gas turbines in place of the natural gas until the natural gas supply is restored. One example of a potential alternate fuel is ethane which is a known highly reactive fuel (HRF). With the introduction of hydraulic fracturing as a means to extract natural gas, a large surplus of ethane has materialized throughout the world.

As can be expected, there are various technical challenges associated with substituting one fuel such as ethane or other a HRF for another in a gas turbine combustor, particularly in combustors that are highly tuned over a narrow range of operating conditions based on the various fuel properties (i.e. fuel density, reactivity and wobbe index) of natural gas fuel.

Highly reactive fuels (HRFs) such as ethane typically have a higher heating value (HHV) and Wobbe Number (described below), than natural gas. HRFs may be diluted with an inert such as nitrogen to reduce the Wobbe Number, to that of the pipeline natural gas. However, this process increases the costs and may thus lower the competitiveness of using an HRF as a substitute fuel.

The incoming gas Wobbe Number (WN) and the Modified Wobbe Index (MWI) of the gas supplied to the turbine are particularly important fuel properties. The WN is defined as:

$$WN = \frac{HHV}{\sqrt{SG}}$$

Where:
HHV is the higher heating value of the gas fuel; and SG is the specific gravity of the gas fuel or gas fuel and steam mixture relative to air. The WN is used as an interchangeability index to permit gas fuels of various heating values to be utilized in the same combustion system without changing hardware. Temperature is not included in this equation for WN because gas is typically delivered at approximately ground temperature with little variation throughout the year.

The MWI is defined as:

$$MWI = \frac{LHV}{\sqrt{(SGx(460 + T_g)}}$$

where:
LHV is the lower heating value of the gas fuel or gas fuel and steam mixture and Tg is the gas fuel or gas fuel and steam mixture temperature in degrees Fahrenheit. MWI more accurately measures the energy delivered through a fuel nozzle at a given pressure ratio than WN. This distinction between MWI and WN becomes very important when gas fuel is heated before delivery to the gas turbine.

The sudden increase in variation of gas properties that result when switching between natural gas fuel and a highly reactive fuel such as ethane significantly affects the operability of the combustion system. Since it would be impractical to tune the combustion system to account for this variation, operation beyond the capability of the combustor could result, leading to increased combustion dynamics and operation outside of emissions compliance.

Therefore, there is a need for a system and method for reducing the HHV of an alternate HRF such as ethane. The system and method should permit adjustment of the MWI over a wide range without the need for significant temperature adjustment of the gas fuel. The system and method should provide a diluent for reducing the LHV and the resulting MWI. The system and method should not require an additional fuel separator and a fuel superheater. The system and method should not significantly increase the cost of delivered gas per unit of energy when compared to existing fuel delivery systems. The system should provide for purging either the natural gas or the HRF from the fuel system.

BRIEF DESCRIPTION OF THE INVENTION

Aspects and advantages of the invention are set forth below in the following description, or may be obvious from the description, or may be learned through practice of the invention.

One embodiment of the present invention is a system for modulating a modified wobbe index of a highly reactive fuel. The system includes a gas turbine having a combustor, a turbine downstream from the combustor, a gas fuel supply, a first fuel distribution manifold that is fluidly coupled between the gas fuel supply and the combustor and a second fuel distribution manifold fluidly coupled between the gas fuel supply and the combustor. The system further includes a heat recovery steam generator that is disposed downstream from the turbine. The heat recovery steam generator provides a flow of steam to the first fuel distribution manifold via a first flow control valve and a flow of steam to the second fuel distribution manifold via a second flow control valve.

Another embodiment of the present invention is a method for Method for providing highly reactive gas fuel to a combustor. The method includes injecting steam from a heat recovery steam generator into a first fuel distribution manifold which is fluidly coupled downstream from a gas fuel supply and upstream from the combustor. The method further includes mixing the steam with a highly reactive gas fuel from the gas fuel supply within the first fuel distribution manifold to form a first steam and gas fuel mixture and injecting the first steam and gas fuel mixture from the first fuel distribution manifold into a first premix fuel circuit of the combustor.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
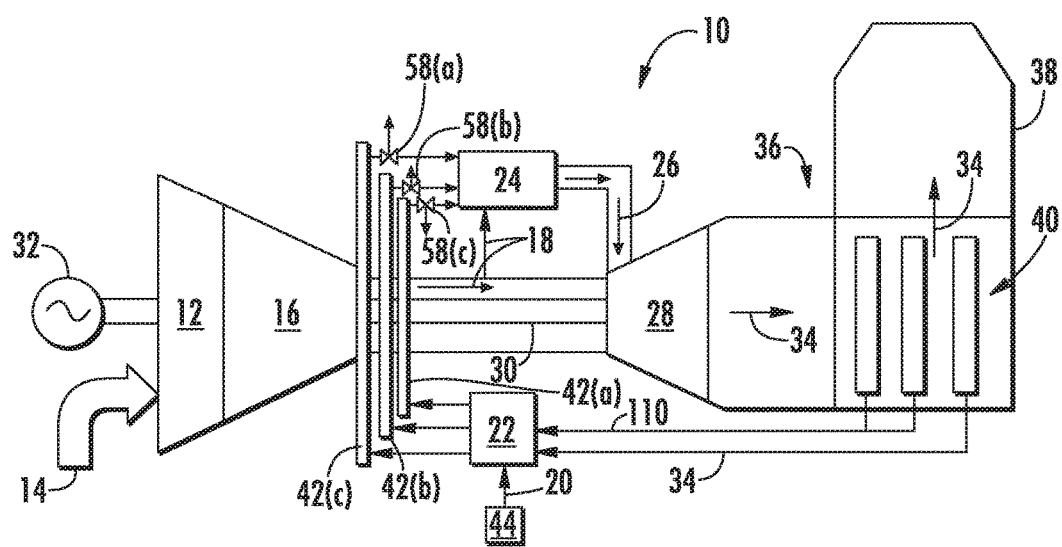
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

An embodiment of the present invention takes the form of an application and process that may inject superheated steam extracted from either a Heat Recovery Steam Generator (HRSG), a steam turbine of a combined cycle power plant, or other source, into the gas fuel, upstream of the combustion system, to modulate the Modified Wobbe Index (MWI) of the fuel. An embodiment of the present invention may be applied with a single heat exchanger, a plurality of heat exchangers or may not include any heat exchangers. An embodiment of the present invention may take the form of a system and method for purging various fuel distribution manifolds of the combustion system using steam from the steam injection system.

An embodiment of the present invention has the technical effect of broadening the range of combustor operability limits with respect to the MWI of the supplied gas fuel. As described below, the point of steam injection may be downstream of a fuel supply and upstream from a fuel distribution manifold that feeds fuel to the combustors. The point of steam injection may be downstream from one or more heat exchangers that are in thermal communication with the fuel supply.

The present invention may inject a relatively small amount of superheated steam into the gas fuel supply line prior to the gas fuel entering the combustion system. The steam/gas ratio may range from about 1:100 to about 30:100; which may ensure that the superheated steam does not condense in the gas fuel line.

An embodiment of the present invention may be used to control the MWI of various industrial components, which may require a gas fuel. For example, but not limiting of, the present invention may be applied to a heavy duty gas turbine, an aero-derivative gas turbine or a boiler. The following detailed description of preferred embodiments refers to the accompanying drawings, which illustrate specific embodiments of the invention. Other embodiments having different structures and operations do not depart from the scope of the present invention.

Referring now to the drawings, wherein identical numerals indicate the same elements throughout the figures, FIG. 1 provides a functional block diagram of an exemplary power plant site comprising a gas turbine 10 that may incorporate various embodiments of the present invention. As shown, the gas turbine 10 generally includes an inlet section 12 that may include a series of filters, cooling coils, moisture separators, and/or other devices to purify and otherwise condition air 14 or other working fluid entering the gas turbine 10. The air 14 flows to a compressor section where a compressor 16 progressively imparts kinetic energy to the air 14 to produce compressed air 18.

The compressed air 18 is mixed with a fuel 20 such as natural gas from a fuel supply system 22 to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (HRSG) 40 for cleaning and extracting additional heat from the exhaust gases 34 prior to release to the environment. For example, the HRSG 40 may include various heat exchangers in thermal communication with the exhaust gases which generate superheated steam. The superheated steam may then be routed to various components at the power plant site such as to one or more steam turbines (not shown).

As shown in FIG. 1, the fuel supply system may include various fuel distribution manifolds or rings 42(a), 42(b) & 42(c) that are each adapted to receive a fuel from the fuel supply system 22 and to distribute the fuel to various fuel circuits (not shown) defined within each combustor 24. The various fuel circuits may allow for greater fuel control flexibility to one or more fuel nozzles positioned within the combustors. For example, fuel distribution manifold 42(a) may provide a portion of fuel 20 to a first premix circuit or PM1 within the combustor while fuel distribution manifolds 42(b) and 42(c) may provide fuel to second and third premix manifolds or PM2 and PM3 respectfully.

Figure 2:
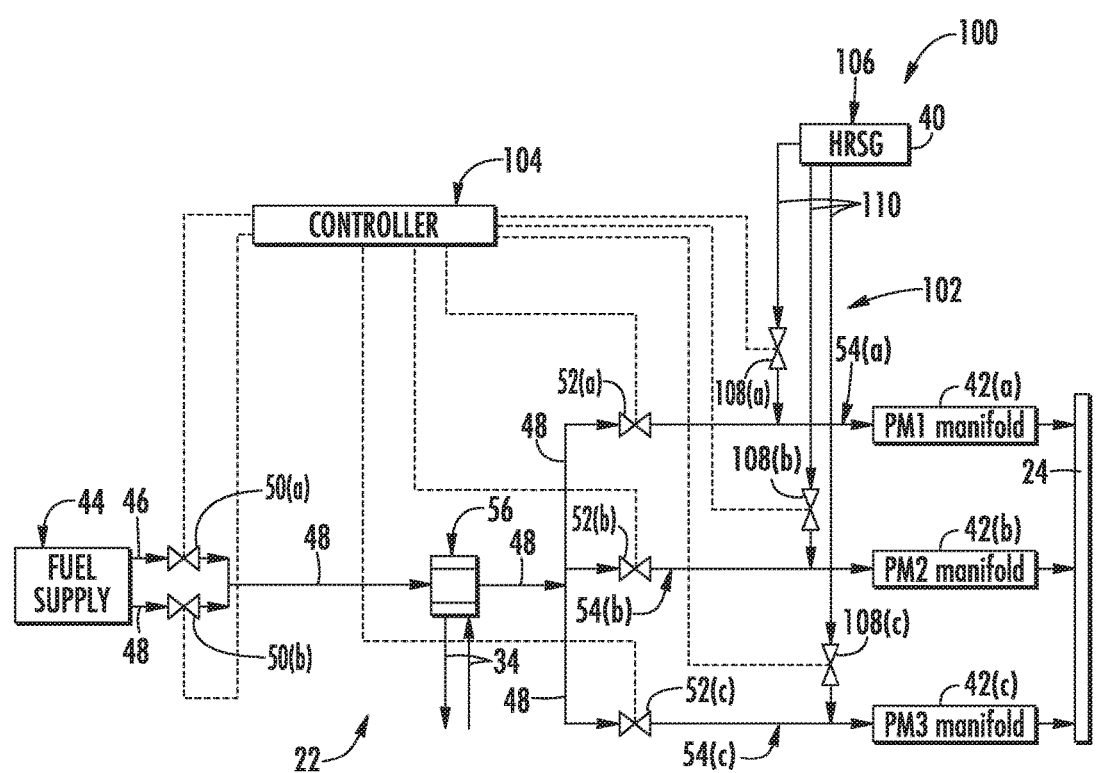
FIG. 2 is a schematic illustrating an example of a system for modulating the MWI and for purging a highly reactive fuel from a combustor utilizing steam injection in accordance with an embodiment of the present invention.

FIG. 2 is a schematic illustrating an example of a system 100 for modulating the MWI of a gas fuel utilizing steam injection in accordance with an embodiment of the present invention. As illustrated, the system 100 may be integrated with the power plant illustrated in FIG. 1. In particular embodiments, the system 100 includes the fuel supply system 22, at least one steam injection system 102 that is in fluid communication with the fuel supply system 22 upstream from the one or more fuel distribution manifolds 42(a-c) and a controller 104 that is electronically connected to and/or in electronic communication with the fuel supply system 22 and the steam injection system 102.

As shown in FIG. 2, the fuel supply system 22 is fluidly connected to at least one fuel supply or source 44. The fuel source 44 may comprise one or more storage tanks and/or a pipeline (not shown). The fuel source 44 may provide one or more gaseous fuels to the fuel supply system 22. For example, the fuel source 44 may provide a primary fuel such as natural gas (NG) as indicated schematically by arrows 46 and/or a highly reactive fuel (HRF) such as ethane as indicated schematically by arrows 48 to the fuel supply system 22. One or more control or stop valves 50(a) and 50(b) may be provided to control the flow of the corresponding fuel 46, 48 from the fuel source 44 to the fuel supply system 22. The valves 50(a) and 50(b) may be in electronic communication with and/or electronically controlled by the controller 104.

The fuel supply system 22 comprises one or more flow control or stop valves 52(a-c) for controlling flow to a corresponding fuel circuit 54(a-c) of the fuel supply system 22. Each fuel circuit 54(a-c) includes one or more fluid conduits, pipes and/or couplings which provide flow paths between valves 52(a-c) and a corresponding fuel distribution manifold 42(a-c). Although three flow control or stop valves are shown, the system may include any number of the flow control or stop valves and is not limited to three. The valves 52(a), 52(b) and 52(c) may be in electronic communication with and/or electronically controlled by the controller 104. In particular embodiments, the fuel supply system 22 may include one or more heat exchanger(s) 56 disposed downstream from the fuel supply 44 and upstream from the fuel distribution manifold(s) 42(a-c).

The heat exchanger(s) 56 may be in thermal communication with a heat source such as the HRSG 40, a steam turbine and/or a boiler that provides a heat transfer media to the heat exchanger(s) 56. In particular embodiments, the heat exchanger(s) 56 may be adapted to receive thermal energy from the exhaust gases 34 flowing through the exhaust section 36 of the gas turbine 10. At least one heat exchanger 54 may be disposed upstream from valves 52(a-c). In particular embodiments, one or more heat exchangers 54 may be disposed downstream from valves 52(a-c). Additional heat exchangers may be required such as when a first heat exchanger is only suitable for preheating the HRF 48. Additional heat exchangers may be connected in tandem, or the like, with heat exchanger 54.

The steam injection system 102 may be fluidly coupled to the fuel supply system 22 and the fuel distribution manifold(s) 42(a-c) via various fluid couplings such as pipes, fluid conduits and/or various valves which define various fluid flow paths between a steam source 106 of the steam injection system 102 such but not limited to the HRSG 40 and the one or more fuel distribution manifold(s) 42(a-c). In various embodiments, the steam injection system 102 may include at least one stop and/or flow control valve 108 disposed downstream from the steam source 104 and upstream from a corresponding fuel distribution manifold 42(a-c). In one embodiment, as shown in FIG. 2, the steam injection system includes at least three stop and/or flow control valves 108(a-c).

In particular embodiments, the valves 108(a), 108(b) and 108(c) are disposed downstream from valve(s) 52(a), 52(b) and/or 52(c) respectively. Valves 108(a), 108(b) and/or 108(c) may be in electronic communication with and/or electronically controlled by the controller 104. The valves 108(a-c) may be of a type capable of functioning under the operation conditions associated with the steam injection system 102. The valves 108(a-c) may operate in a linear range allowing for accurate flow control. For example, but not limiting of, valves 108(a-c) may allow for limiting the flow rate of a superheated steam flowing from the steam source 106 as indicated schematically by arrows 110 to between 5-10% of the maximum flow-rate through the steam injection system 102. In particular embodiments, as shown in FIG. 1, one or more purge valves or drains 58(a-c) may be disposed downstream from valves 108(a), 108(b) and 108(c) and/or downstream from the fuel distribution manifolds 42(a-c).

The controller 104 may be configured to automatically or continuously monitor the MWI of the incoming HRF 48 supplied to the power plant site from a gas supplier. Alternatively, the controller 104 may be configured to require a user action to initiate operation of the steam injection system 102. An embodiment of the controller 104 of the present invention may function as a stand-alone system. Alternatively, the controller 104 may be integrated as a module, or the like, within a broader system, such as a turbine control or a plant control system.

During operation of the gas turbine 10, it may become necessary and/or desirable to burn a HRF such as ethane or other highly reactive fuel when the primary fuel such as natural gas becomes unavailable. As a result, it may become necessary to adjust or modify the various properties of the HRF such as the modified wobbe number or the modified wobbe index of the HRF so as to prevent potential emissions compliance issues or other potential thermal or mechanical issues.

In operation, the HRF 48 is provided to the fuel supply system 22. The HRF 48 may then flow through the heat exchanger(s) 54. Thermal energy from a heat transfer media such as the exhaust gases 34 from the gas turbine 10 flows through the heat exchanger 56 and is transferred to the HRF 48, thereby increasing the HRF temperature. The increase in fuel temperature may increase the overall performance of the power plant site. The temperature of the HRF 48 may be increased, for example, but not limiting of, to a range between about 350 to about 500 degrees Fahrenheit. The amount of temperature increase may vary due to, for example, but not limiting of, on the gas turbine type (frame size, or the like) and configuration (combustion system type).

The HRF 48 may then flow downstream from the heat exchanger(s) 56 where it may be distributed to valve(s) 52(a-c). Based at least in part on current operating conditions of the gas turbine 10, the controller 104 may actuate fully or at least partially between an open and closed position one or more of valves 52(a-c) thereby charging with the HRF 48 or shutting off a corresponding fuel distribution manifold(s) 42(a-c). The controller 104 may actuate fully or at least partially between an open and closed position one or more of valves 108(a), 108(b) and/or 108(c) thereby allowing for a flow of the superheated steam 110 to be injected into and mixed with the flow of the HRF 48 upstream from the corresponding fuel distribution manifold 42(a-c). The steam injection system 102 primarily serves to supply the superheated steam 110 for use in modulating the MWI of the HRF 48 (as discussed below).

In one embodiment, one or more of valves 52(a-c) may be closed thus closing off the flow of fuel thereto and the corresponding valve(s) 108(a-c) may be opened, thereby using the superheated steam to purge the HRF 48 from the corresponding fuel distribution manifold 42(a-c).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
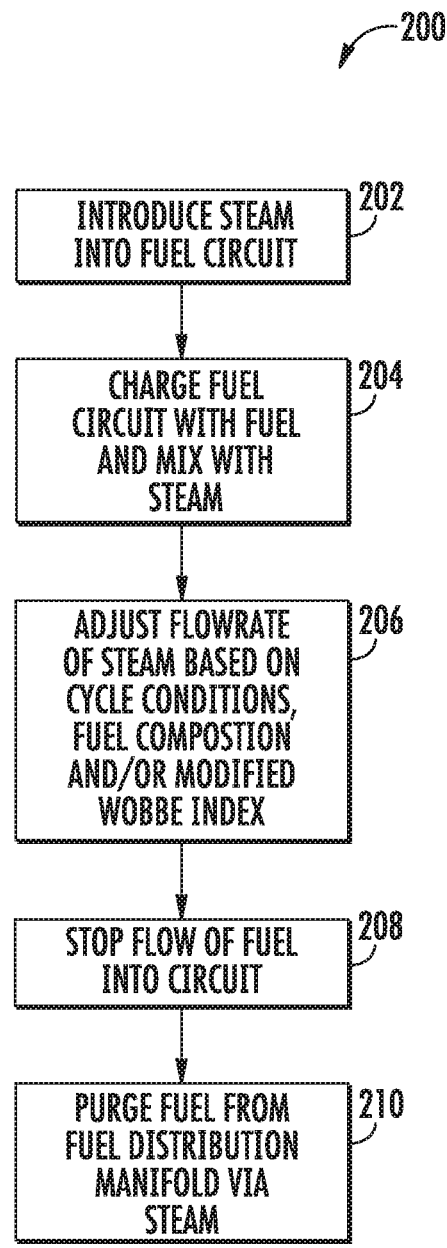
FIG. 3 is a flowchart illustrating an example of a method of modulating the MWI of a highly reactive fuel and purging a highly reactive fuel from a combustor utilizing steam injection in accordance with an embodiment of the present invention.

FIG. 3 is a flowchart illustrating an example of a method 200 of modulating the modified wobbe index (MWI) of a high reactivity fuel (HRF) such as ethane or the like by utilizing the steam injection system 102 in accordance with an embodiment of the present invention. At step 202, method 200 includes introducing the superheated steam 110 from the steam source 106 into at least one fuel circuit 53(a-c) upstream from its corresponding fuel distribution manifold 42(a-c).

Figure 4:
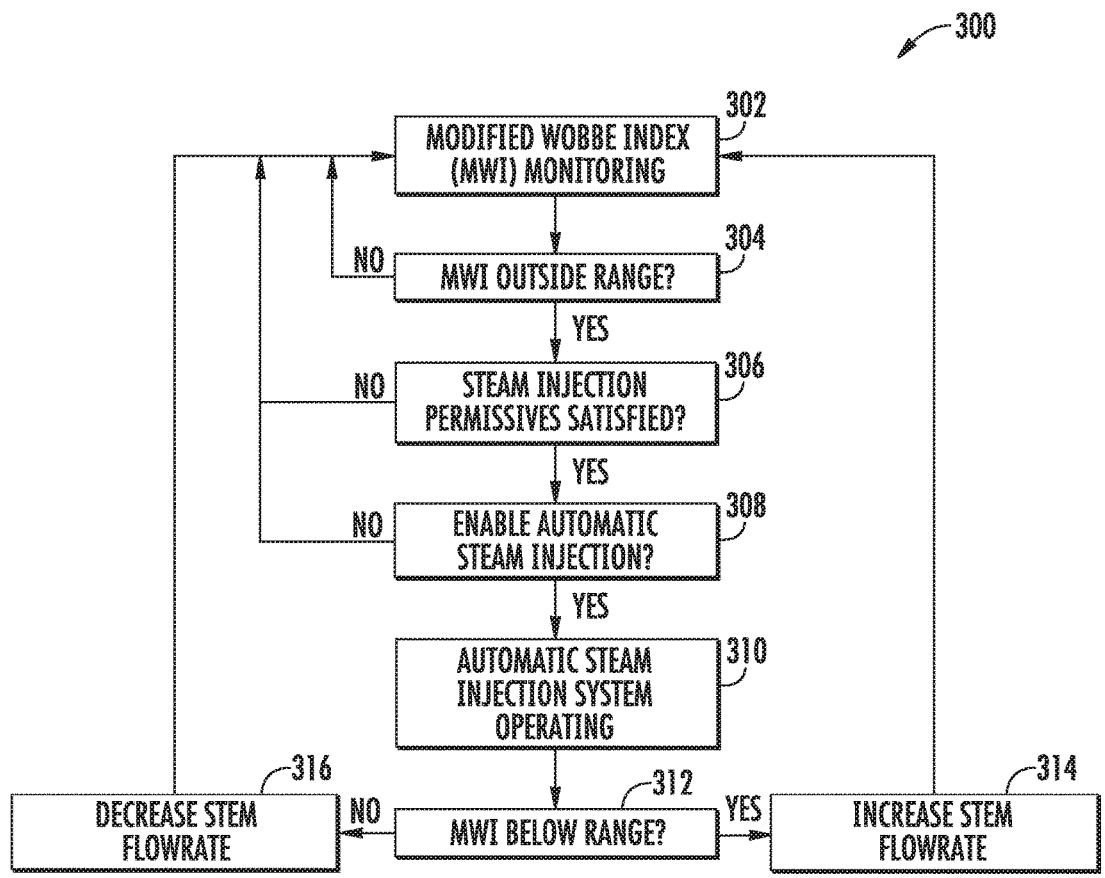
FIG. 4 is a flowchart illustrating an example of a method of modulating the MWI of a highly reactive fuel utilizing steam injection in accordance with an embodiment of the present invention.

At step 204, method 200 includes charging the corresponding fuel circuit 53(a-c) with the HRF 48 and mixing the HRF 48 with the superheated steam 110 therein. At step 206. Method 200 includes adjusting the flowrate of the superheated steam 110 into the fuel circuit(s) 54(a-c) based at least in part on cycle conditions and/or fuel composition. At step 208, method 200 includes stopping the flow of the HRF 48 and at step 210, method 200 includes purging the corresponding fuel distribution manifold 42(a-c) of the HRF 48 via the superheated steam 110. For example, the superheated steam may be routed through the fuel distribution manifold(s) 42(a-c) and exhausted from the gas turbine FIG. 4 is a flowchart illustrating an example of a method 300 of modulating the MWI of a high reactivity fuel (HRF) such as ethane or the like by utilizing the steam injection system 102 in accordance with an embodiment of the present invention. Method 300 may be incorporated into method 200 as previously presented. At step 302 the method 300 may monitor the MWI of the HRF 48. As discussed, the MWI of the HRF 48 may fluctuate as the power plant site receives the HRF 48 with varying properties. As discussed, the MWI is defined as:

$$MWI = \frac{LHV}{\sqrt{(SGx(460 + T_g)}}$$

The variables may be defined as: LHV is the lower heating value of the gas fuel or gas fuel and steam mixture; SG is the specific gravity of the gas fuel or gas fuel and steam mixture relative to air; and Tg is the gas fuel or gas fuel and steam mixture temperature in degrees F.

Method 300 may receive data from the controller 104 on the variables within the equation for MWI, and then determine the MWI utilizing the aforementioned equation. At 304, method 300 may determine whether the MWI value determined in step 302 is outside of a desired operating range. The present invention may allow for a user to set the desired range and acceptable deadband for the MWI. This may be useful for example, but not limiting, of, where the combustor 24 includes replacement nozzles that may operate with a different range of MWI from the OEM fuel nozzles. Here the present invention may allow the user to change the MWI operating range. In alternate embodiment of the present invention, the original equipment manufacturer (OEM) of the combustor 24 may require that the MWI range is fixed and set by the OEM. If method 300 determines that the MWI is outside of the desired range and an acceptable deadband, then method 300 may proceed to step 306, otherwise method 300 may revert to step 302.

At step 306, method 300 may determine whether the steam injection system 102 permissive is satisfied. An embodiment of the present invention may allow the user to configure at least one steam injection permissive. The at least one steam injection permissive may include one of the following permissives: the gas turbine 10 is operating on a gas fuel; the gas fuel temperature is between about 350 to about 500 degrees Fahrenheit; the gas turbine 10 is operating on temperature control; steam temperature and pressure are operating within ranges specific to the power plant site; superheated steam has preheated the steam path; maintain about 50 degrees Fahrenheit of superheat temperature above the saturation steam temperature; steam injection system 102 flow-rate limited to 30% of the maximum gas fuel flow rate. If the steam injection permissive is satisfied, then method 300 may proceed to step 308; otherwise method 300 may revert to step 302.

At 308, method 300 may enable the steam injection system 102 to operate. An embodiment of the present invention may prompt the user to enable the steam injection system 102 to operate. In an alternate embodiment of the present invention, method 300 may be self-enabling after the steam injection permissive is satisfied in step 306. If the steam injection system 102 is enabled, then method 300 may proceed to step 310; otherwise method 300 may revert to step 302.

In step 310, method 300 may begin operating the steam injection system 102. A user may pre-configure the method 300 to automatically start up after step 308 is satisfied. A user may desire this option if, for example, the operation of the steam injection system 102 is conducted remotely. Alternatively, method 300 may be pre-configured to require a user action to start the steam injection system 102. The user action may be, but is not limited to, selecting a "steam injection system start" button, or the like, on a display where the steam injection system 102 may be controlled.

At 312, method 300 may determine whether the MWI value is below a desired operating range and deadband. Method 300 may determine the effect on the MWI on the HRF 48 since the operation of the steam injection system 102 started. At 312, the method 300 may determine the new MWI for comparison with the desired MWI range, as previously described in step 304. In step 312, the method 300 may also determine whether the MWI is above a desired range and deadband. If the method 300 determines that the MWI is still above the desired range, then the method 300 may proceed to step 314, otherwise the method 300 may proceed to step 316.

At 314, the method 300 may increase the flowrate of the steam injection system 102 to decrease the MWI. A user may increase the stroke of the flow control valve(s) 108(a-c) to increase the flowrate of the steam injection system 102. In an alternate embodiment of the present invention the control system may automatically increase the stroke of the flow control valve(s) 108(a-c). After the method 300, in step 314, increases the flowrate of the steam injection system 102, method 300 may revert to step 302.

At step 316, method 300 may decrease the flowrate of the steam injection system 102 to increase the MWI. Here, a user may adjust the stroke of the flow control valve(s) 108(a-c) to decrease the flowrate of the steam injection system 102, as required. In an alternate embodiment of the present invention the controller 104 may automatically adjust the stroke of the flow control valve(s) 108(a-c) to decrease the MWI. After the method 300, in step 316, decreases the flowrate of the steam injection system 102, the method 300 may revert to step 302.

The system and method provided herein provides several benefits over existing fuel supply systems for providing highly reactive fuels to a combustor. For example, the system enables the burning of highly reactive fuels, such as ethane, present in amounts of from 25% to 100% by mass of the fuel, without the risk of flame holding. In addition or in the alternative, the system reduces, by 3-4 times, the amount of steam being introduced when compared with previous MNQC systems. As a result, operating costs and environmental impact are also reduced. For example, the ratio of steam to ethane may be reduced from 1.2:1 to 0.32:1 when using 100% ethane. In addition or in the alternative, the controller 104 may be configured to adjust the steam content, based on the cycle conditions (including environmental conditions) and fuel composition. At low loads and/or on cold days, less steam or no steam may be needed. In addition or in the alternative, the circuit-level doping allows different amounts of steam to be introduced into each fuel circuit, as fuel splits dictate. In addition or in the alternative, the purge feature of this system is simpler to use than traditional inert (N2) purges, which require booster compressor and a separate source of N2. In some cases, the N2 could be obtained via an Air Separation Unit. Thus, with this invention, the capital expense for the ASU and booster compressor is eliminated.

It should be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed:

1. A system for modulating a modified Wobbe index of a highly reactive fuel, comprising:
    a gas turbine having a combustor, a turbine downstream from the combustor, a gas fuel supply, a first fuel distribution manifold fluidly coupled between the gas fuel supply and the combustor and a second fuel distribution manifold fluidly coupled between the gas fuel supply and the combustor;
    a first fuel circuit extending from a first stop valve downstream of the gas fuel supply to the first fuel distribution manifold;
    a second fuel circuit extending from a second stop valve downstream of the gas fuel supply to the second fuel distribution manifold; and
    a heat recovery steam generator disposed downstream from the turbine, the heat recovery steam generator connected directly to the first fuel circuit through a first flow control valve and connected directly to the second fuel circuit through a second flow control valve, wherein the heat recovery steam generator provides a first flow of steam to the first fuel distribution manifold via the first flow control valve and a second flow of steam to the second fuel distribution manifold via the second flow control valve.

2. The system as in claim 1, wherein the first fuel distribution manifold and the first flow control valve are fluidly coupled to a first premix fuel circuit of the combustor.

3. The system as in claim 1, wherein the second fuel distribution manifold and the second flow control valve are fluidly coupled to a second premix fuel circuit of the combustor.

4. The system as in claim 1, further comprising a heat exchanger positioned between the gas fuel supply and the first fuel distribution manifold, wherein the heat exchanger is in thermal communication with the highly reactive fuel flowing from the gas fuel supply to the first fuel distribution manifold.

5. The system as in claim 1, further comprising a heat exchanger positioned between the gas fuel supply and the second fuel distribution manifold, wherein the heat exchanger is in thermal communication with the highly reactive fuel flowing from the gas fuel supply to the second fuel distribution manifold.

6. The system as in claim 1, further comprising a third fuel distribution manifold fluidly coupled between the gas fuel supply and the combustor and a third flow control valve positioned downstream from the gas fuel supply, wherein the heat recovery steam generator provides a third flow of steam to the third fuel distribution manifold via the third flow control valve.

7. The system as in claim 6, wherein the third flow control valve is fluidly coupled to the third fuel distribution manifold at a location that is downstream from the gas fuel supply and upstream from the third fuel distribution manifold.

8. The system as in claim 6, wherein the third fuel distribution manifold and the third flow control valve are fluidly coupled to a third premix fuel circuit of the combustor.

9. The system as in claim 6, further comprising a heat exchanger positioned between the gas fuel supply and the third fuel distribution manifold, wherein the heat exchanger is in thermal communication with the highly reactive fuel flowing from the gas fuel supply to the third fuel distribution manifold.

* * * * *